(12) United States Patent
Bishop et al.

(10) Patent No.: US 12,265,509 B2
(45) Date of Patent: Apr. 1, 2025

(54) LOADING DATA FILES INTO HIERARCHICAL STORAGE SYSTEM

(71) Applicant: Optum, Inc., Minnetonka, MN (US)

(72) Inventors: William H. Bishop, Raleigh, NC (US); Christopher A. Connor, Youngsville, NC (US); Sloan H. Holliday, Apex, NC (US)

(73) Assignee: Optum, Inc., Minnetonka, MN (US)

(*) Notice: Subject to any disclaimer, the term of this patent is extended or adjusted under 35 U.S.C. 154(b) by 0 days.

(21) Appl. No.: 18/186,642

(22) Filed: Mar. 20, 2023

(65) Prior Publication Data

US 2024/0411730 A1   Dec. 12, 2024

(51) Int. Cl.
    G06F 17/00   (2019.01)
    G06F 7/00    (2006.01)
    G06F 16/172  (2019.01)
    G06F 16/185  (2019.01)

(52) U.S. Cl.
    CPC .......... *G06F 16/185* (2019.01); *G06F 16/172* (2019.01)

(58) Field of Classification Search
    CPC .............................. G06F 16/185; G06F 16/172
    USPC ........................................................ 707/829
    See application file for complete search history.

(56) References Cited

U.S. PATENT DOCUMENTS

| | | | |
|---|---|---|---|
| 8,010,391 B2 * | 8/2011 | Wait ....................... | G06Q 10/10 705/4 |
| 11,011,258 B1 | 5/2021 | Temkin et al. | |
| 11,120,899 B1 | 9/2021 | Rai et al. | |
| 2005/0071194 A1 * | 3/2005 | Bormann ............... | G16H 10/60 705/2 |
| 2005/0240447 A1 * | 10/2005 | Kil ......................... | G06Q 10/10 705/4 |
| 2008/0103816 A1 * | 5/2008 | Kaplan .................. | G16H 40/20 705/2 |

(Continued)

FOREIGN PATENT DOCUMENTS

WO   2021174169 A1   9/2021

OTHER PUBLICATIONS

Grimes et al., "Pathling: analytics on FHIR", Journal of Biomedical Semantics, vol. 13, No. 1, Springer Nature Switzerland AG, Sep. 8, 2022, 19 pp., URL: https://link.springer.com/article/10.1186/s13326-022-00277-1.

HL7 FHIR, "Base Resource Definitions", HL7 International, vol. 5, 18 pp., Retrieved from the Internet on May 11, 2022 from URL: https://www.hl7.org/fhir/resource.html#id.

(Continued)

*Primary Examiner* — Pavan Mamillapalli

(74) *Attorney, Agent, or Firm* — Shumaker & Sieffert, P.A.

(57) ABSTRACT

A data file comprising a plurality of rows, each of the rows includes at least a first column and a second column, the first column contains a first-level resource ID that identifies a first-level resource, the second column provides information regarding the first-level resource. For each respective unique first-level resource ID, the processing circuitry identifies a row set for the respective first-level resource ID, performs a sequential deduplication process on the row set, and enqueues remaining rows in a queue for a thread assigned to the respective first-level resource ID. For each row enqueued in the queue for the thread, the thread dequeues the row from the queue for the respective thread, requests creation of a second-level resource that stores a version of the data element contained in the second column of the dequeued row, and requests creation of relationship data for the second-level resource.

19 Claims, 7 Drawing Sheets

(56) References Cited

U.S. PATENT DOCUMENTS

| | | | |
|---|---|---|---|
| 2010/0211413 A1* | 8/2010 | Tholl | G06Q 10/00 |
| | | | 705/4 |
| 2010/0211414 A1* | 8/2010 | Tholl | G06Q 40/08 |
| | | | 705/4 |
| 2015/0149362 A1 | 5/2015 | Baum et al. | |
| 2018/0150609 A1* | 5/2018 | Kim | G06N 3/04 |
| 2020/0202988 A1 | 6/2020 | Gold et al. | |
| 2020/0251194 A1 | 8/2020 | Vogt et al. | |
| 2021/0058229 A1 | 2/2021 | Jiang et al. | |
| 2021/0210160 A1 | 6/2021 | Shelton | |
| 2021/0343418 A1 | 11/2021 | Thompson et al. | |
| 2022/0101970 A1 | 3/2022 | Graham | |
| 2022/0310217 A1 | 9/2022 | Hennie et al. | |
| 2022/0319645 A1 | 10/2022 | Scipioni et al. | |
| 2022/0343419 A1 | 10/2022 | Rolls et al. | |

OTHER PUBLICATIONS

HL7 FHIR, "Extended Operations on the RESTful API", HL7 International, vol. 5, 6 pp., Retrieved from the Internet on May 11, 2022 from URL: https://www.hl7.org/fhir/operations.html.

HL7 FHIR, "Resource Provenance—Content", HL7 International, vol. 5, 7 pp., Retrieved from the Internet on May 11, 2022 from URL: https://www.hl7.org/fhir/provenance.html.

HL7 FHIR, "Resource References", HL7 International, vol. 5, 17 pp., Retrieved from the Internet on May 11, 2022 from URL: https://www.hl7.org/fhir/references.html.

Robinson et al., "Fast and simple comparison of semi-structured data, with emphasis on electronic health records", bioRxiv, Apr. 2, 2018, 13 pp., URL: https://www.biorxiv.org/content/10.1101/293183v2.full.pdf.

* cited by examiner

| | First Name | Last Name | Patient ID | Claim ID | Claim Date |
|---|---|---|---|---|---|
| 202A | Jane | Doe | 123 | 2294857 | 1/1/2020 |
| 202B | Jane | Smith | 123 | 948547 | 1/9/2020 |
| 202C | Jane | Doe | 123 | 837683 | 6/19/2022 |
| 202D | Jane | Doe | 123 | 9384775 | 6/21/2022 |

LOADING DATA FILES INTO HIERARCHICAL STORAGE SYSTEM

TECHNICAL FIELD

This disclosure relates to exchanging healthcare data between computer systems.

BACKGROUND

Fast healthcare interoperability resources (FHIR) is an interoperability standard for exchanging healthcare data between different computer systems regardless of how the data is stored in those systems. The FHIR specification uses representational state transfer (REST) techniques to enable integration of a wide range of healthcare teams and organizations. Legacy systems often exchange healthcare data using flat files (e.g., comma-separated value (CSV) files). One method to enable FHIR for legacy data is to load flat file data into an "FHIR server" to make legacy data available for exchange using FHIR standards.

Healthcare data is generated and consumed by doctors, hospitals, patients, and insurance companies, for example, and is stored in an electronic health record (EMR). FHIR standardizes the format of the healthcare records and allows for data interchange between the diverse entities that create, modify, and use healthcare data.

SUMMARY

The present disclosure describes techniques that may ensure that in a concurrent environment, resources included in data files, such as flat files, are loaded into a server, such as a FHIR server, consistent with point-in-time architecture while maintaining chronological order in an efficient manner. In accordance with techniques described herein, a computing system may receive a data file comprising a plurality of columns and a plurality of rows corresponding to the plurality of columns, each row includes a unique identifier (ID) and a plurality of information, collect each row of the plurality of rows corresponding to a respective unique ID, and align the collected rows for the respective unique ID into a unique ID data set.

For each of the collected rows, the computing system may determine whether information in a particular column of a particular row of the unique ID data set is same or different as information in the particular column of a neighboring row of the unique ID data set. In response to determining that the information is the same, the computing system may compress the particular row and the neighboring row into a compressed row. In response to determining that the information is different, the computing system may maintain the particular row and the neighboring row as two distinct maintained rows. The computing system may arrange each of the respective compressed rows and each of the respective maintained rows into a collected row data set and load the collected data set to a server, such as a FHIR server. The computing system may assign the collected row data to a particular thread to be processed and load the processed collected row data to a server, such as a FHIR server.

In some examples, the compression and/or processing of the data file, such as a flat file, before loading the data file to a FHIR server may help ensure that in a concurrent environment, resources included in data files, are loaded into a server, such as a FHIR server, consistent with point-in-time architecture while maintaining chronological order in an efficient manner. In addition, the compression and/or processing of the data file, such as a flat file, before loading the data file to a server, such as a FHIR server may help eliminate sequential repeats in a data file to be loaded to a server, such as a FHIR server. Eliminating sequential repeats in a data file may prevent "version bloat" in a FHIR server and reduce communication between an FHIR loader and FHIR server.

In this examples, this disclosure describes a computer system comprising: a memory configured to store a data file comprising a plurality of rows each including a first column and a second column, wherein: the first column contains first-level resource IDs that each identify a respective first-level resource, and the second column contains a data element that provides information regarding the respective first-level resource; and processing circuitry communicatively coupled to the memory, the processing circuitry configured to: initiate one or more threads assigned to one or more of the first-level resource IDs that are unique, for each of the one or more unique first-level resource IDs: identify a row set that comprises one or more rows of the data file that contain the respective unique first-level resource ID; and for at least one row of the identified row set: determine whether a data element in the second column of the row is different from a data element in the second column of a predecessor row that precedes the row; in response to determining that the data element in the second column of the row is different from the data element in the second column of the predecessor row, enqueue the row in a queue for the respective thread, dequeue the row from the queue for the respective thread; and cause a server to create a second-level resource that stores a version of the data element contained in the second column of the dequeued row.

In another example, this disclosure describes a method comprising: obtaining, by one or more processors, a data file comprising a plurality of rows each including a first column and a second column, wherein: the first column of the row contains first-level resource IDs that each identify a respective first-level resource, and the second column contains a data element that provides information regarding the first-level resource, and initiating, by the one or more processors, one or more threads assigned to one or more of the first-level resource IDs that are unique, for each of the one or more unique first-level resource IDs: identifying, by the one or more processors, a row set that comprises one or more rows of the data file that contain the respective unique first-level resource ID; and for at least one row of the identified row set: determining, by the one or more processors, whether a data element in the second column of the row is different from a data element in the second column of a predecessor row that precedes the row in the identified row set; and in response to determining that the data element in the second column of the row is different from the data element in the second column of the predecessor row, enqueuing, by the one or more processors, the row in a queue for the respective thread, dequeue the row from the queue for the respective thread; and cause a server to create a second-level resource that stores a version of the data element contained in the second column of the dequeued row.

In another example, this disclosure describes a non-transitory computer readable storage medium having instructions stored thereon that, when executed by processing circuitry, cause the processing circuitry to: obtain a data file comprising a plurality of rows each including a first column and a second column, wherein: the first column contains a first-level resource IDs that each identify a first-level resource, and the second column contains a data element that provides information regarding the first-level resource, and initiate one or more threads assigned to one or more of the first-level resource IDs that are unique; for each of the one or more unique first-level resource IDs: identify a row set that comprises one or more rows of the data file that contain the respective unique first-level resource ID; and for at least one row of the identified row set: determine whether a data element in the second column of the row is different from the data element in the second column of a predecessor row that precedes the row; and in response to determining that the data element in the second column of the row is different from the data element in the second column of the predecessor row, enqueue the row in a queue for the respective thread, dequeue the row from the queue for the respective thread; and cause a server to create a second-level resource that stores a version of the data element contained in the second column of the dequeued row.

The details of one or more examples are set forth in the accompanying drawings and the description below. Other features, objects, and advantages will be apparent from the description, drawings, and claims.

DETAILED DESCRIPTION

Many FHIR servers have built-in methods for loading initial bulk data from files, but that process is for initial load only, and it is not intended for incremental data updates. Flat files are files that contain individual records. A single record in a flat file may contain many elements, e.g., a patient name, a claim identifier, and a healthcare provider identifier. The records may be arranged in the flat file in chronological order. Thus, in an example where a flat file contains records corresponding to health insurance claims, later records may correspond to later-filed health insurance claims. In this example, a single flat file may include multiple records corresponding to health insurance claims for a single patient file. In some cases, a patient may have slowly changing data, such as a name change, address change, etc.

Concurrent programming models are required to handle high volumes of data in flat files as quickly as possible. This poses challenges to an FHIR loader to ensure that in a multi-processing environment, healthcare data is loaded in correct order so that point-in-time data is maintained while eliminating race conditions and incorrect version numbering.

The present disclosure describes techniques for ensuring that in a concurrent environment, resources included in data files, such as flat files, are loaded into a server, such as a FHIR server, consistent with a point-in-time architecture while maintaining chronological order in an efficient manner. In addition, the present disclosure describes techniques for eliminating sequential repeats in a data file to be loaded to a FHIR server. Eliminating sequential repeats in a data file may prevent "version bloat" in a FHIR server and reduce communication between an FHIR loader and FHIR server. In some examples, this may include a computing system configured to load during incremental data feeds as well as an initial bulk data load.

Figure 1:
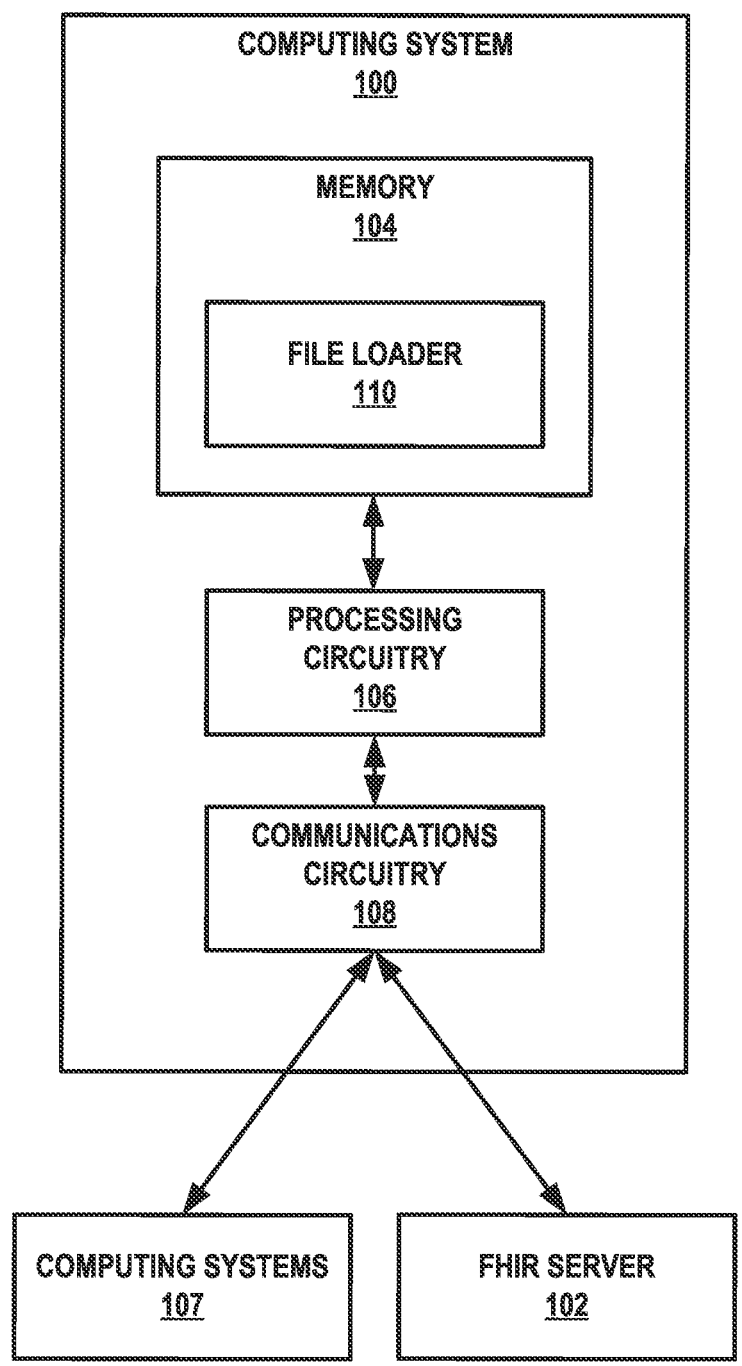
FIG. 1 is a diagram illustrating an example computing system configured to load data files to a FHIR server in accordance with some techniques of this disclosure.

FIG. 1 is a diagram illustrating an example computing system 100 configured to load data files to a FHIR server 102 in accordance with some techniques of this disclosure. FHIR server 102 is an example of a hierarchical data storage system. In other examples of this disclosure, types of hierarchical data storage systems other than a FHIR server may be used in place of FHIR server 102. Although shown in FIG. 1 as being separate from computing system 100, FHIR server 102 may, in some examples, be implemented as part of computing system 100.

Computing system 100 may contain components including memory 104, processing circuitry 106, and communications circuitry 108. While computing system 100 as illustrated in FIG. 1 only includes memory 104, processing circuitry 106, and communications circuitry 108, computing system 100 may include additional components (e.g., control circuitry, arithmetic and logic circuitry, or the like). The additional components may be configured to perform at least some of the techniques disclosed herein. Memory 104, processing circuitry 106, and communications circuitry 108 may be communicatively coupled with each other. In some examples, computing system 100 may be a single computing device. In other examples, computing system 100 may be one or more computing devices. In other examples, computing system 100 may be a cloud computing system. Memory 104 may include one or more non-transitory computer readable storage media.

Processing circuitry 106 comprises circuitry configured to perform processing functions in accordance with one or more techniques of this disclosure. For instance, processing circuitry 106 may include one or more microprocessors, application-specific integrated circuits (ASICs), field-programmable gate arrays (FPGAs), or other types of processing circuitry. In some examples, processing circuitry 106 of computing system 100 may read and may execute instructions stored by memory 104. Processing circuitry 106 may be included in a single device or distributed among multiple devices.

Communications circuitry 108 may enable computing system 100 to send data to and receive data from one or more other computing devices, e.g., via a communications network, such as a local area network or the Internet. In some examples, communications circuitry 108 may include wireless transmitters and receivers that enable computing system 100 to communicate wirelessly with other computing devices. Examples of communications circuitry 108 may include network interface cards, Ethernet cards, optical transceivers, radio frequency transceivers, or other types of devices that are able to send and receive information. Other examples of such communications units may include BLUETOOTH™, 3G, 4G, 5G, WI-FI™ radios, Universal Serial Bus (USB) interfaces, etc. Computing system 100 may use communications circuitry 108 to communicate with one or more other computing devices or systems, such as computing systems 107. Communications circuitry 108 may be included in a single device or distributed among multiple devices. In some examples, the data file is received by computing system 100 from one or more of computing systems 107.

In the example of FIG. 1, memory 104 includes instructions associated with a file loader 110. Processing circuitry 106 may execute the instructions of file loader 110 in order to provide the functionality of file loader 110. In this way, processing circuitry 106 may be configured to provide the functionality of file loader 110. In other examples, the functionality of file loader 110 may be implemented at least partially with firmware in processing circuitry 106 or with fixed-function circuitry included in processing circuitry 106. File loader 110 may be an FHIR loader.

FHIR describes data formats and elements (known as "resources") and an application programming interface (API) for exchanging electronic health records (EHR). Example types of FHIR resources may include patients, observations, and other data elements. FHIR is based on REST APIs that support create, read, update, and delete operations (i.e., CRUD operations). File loader 110 may use these REST APIs to ensure that data ingested from files is consistent with data in the FHIR server. Thus, FHIR server 102 may implement REST APIs that file loader 110 may use to perform CRUD operations. For example, file loader 110 may first interact with FHIR server 102 to search for a resource, and if the resource is not found, file loader 110 may create the resource. If file loader 110 finds the resource, file loader 110 may merge any changes to the resource and then update FHIR server 102 (i.e., perform an "upsert" operation). Note that an "upsert" process is not atomic and may require several interactions with FHIR server 102, which may pose challenges in a highly concurrent program to ensure that race conditions are handled properly or eliminated completely.

FHIR resources may be organized into hierarchies of resources. For example, a FHIR resource may include references to other resources. Using these references, the resources may combine to build a web of information. References are always defined and represented in one direction: from one resource (source) to another (target). A hierarchy of resources may be a more constrained version of such a web of information in which a resource is a root node or the resource only refers to a single higher-level resource.

There are multiple ways to represent hierarchies in FHIR server 102. Depending on the situation, it is often required to implement a "point-in-time" architecture. Those familiar with Data Warehouse technologies may recognize the similarities with Type 2 data warehouse approach for handling "slowly changing dimensions." The point-in-time architecture approach utilizes versioning whenever data changes. Parent-child relationships use the version information to capture point-in-time data. Thus, versions of a resource that correspond to different points in time may themselves be separate resources that refer to the resource itself.

For example, a first resource may correspond to a specific patient. In this example, the specific patient's name at one point in time may be "Jane Doe" while at a later point in time the specific patient's name may be "Jane Smith." Thus, in this example, there may be a second resource having a reference to the first resource and indicating that the specific patient's name is "Jane Doe." In this example, there may be a third resource having a reference to the first resource and indicating that the specific patient's name is "Jane Smith." In this example, the second and third resources may be referred to as "version-resources" because they are resources corresponding to different versions of the same piece of information. Furthermore, in this example, a first health insurance claim may have been filed while the specific patient's name was "Jane Doe" and a second health insurance claim may have been filed while the specific patient's name was "Jane Smith." In this example, when a point-in-time architecture is used, there may be a fourth resource that refers to the second resource (i.e., the resource indicating that the specific patient's name is "Jane Doe") and also a fourth resource that refers to the third resource (i.e., the resource indicating that the specific patient's name is "Jane Smith." In contrast, in a data storage system that does not apply a point-in-time architecture, the third resource and the fourth resource may refer directly to the first resource (i.e., the resource corresponding generally to the specific patient).

When querying a resource without specifying version information, FHIR server 102 returns the "latest" version of the resource by default. For instance, in the example of the previous paragraph, FHIR server 102 should return "Jane Smith" as the name of the specific patient. This is important because file loader 110 may need to ensure proper order so that the latest data in the file is reflected in the highest version of the FHIR resource.

Concurrent programming models are required to handle high volumes of data in flat files as quickly as possible. This may pose challenges to file loader 110 to ensure that in a multi-processing environment, healthcare data is loaded in correct order so that the point-in-time data is maintained while eliminating race conditions and incorrect version numbering. Continuing the "Jane Doe"/"Jane Smith" example from above, a flat file may contain records regarding the two health insurance claims. In a concurrent programming model, different threads may process the records for the two health insurance claims. Due to the non-deterministic nature of process and thread schedulers, the Jane Smith thread might get scheduled before the Jane Doe thread which will cause the version numbers to be reversed (Jane Smith=v1, Jane Doe=v2). Even though the point-in-time architecture would be maintained, the "latest" version of the patient would be Jane Doe, which is incorrect. Therefore, special threading models may be required.

Figures 2, 3:
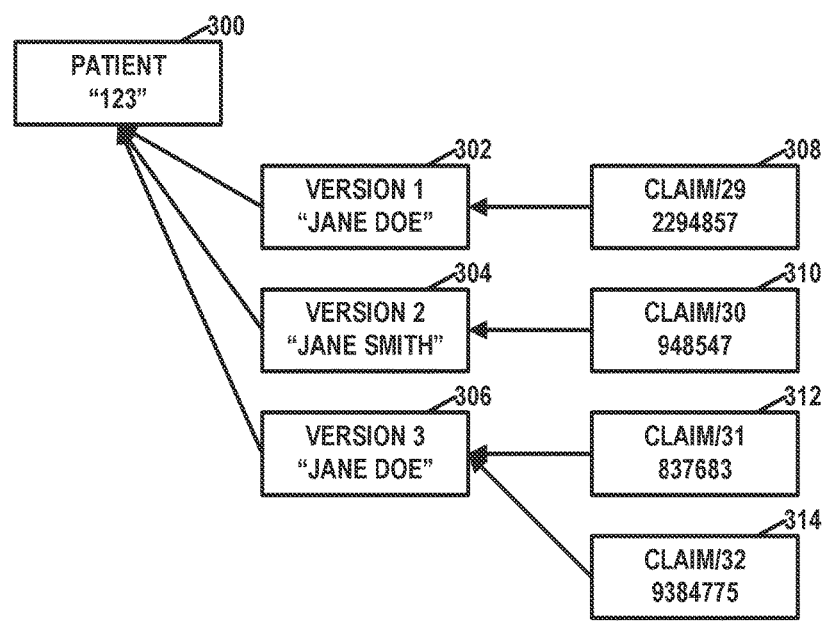
FIG. 2 is a diagram representing a data file containing records related to health insurance claims in accordance with some techniques of this disclosure.
FIG. 3 is a diagram showing an example resource hierarchy that maintains file chronological order and eliminates sequential repeats according to some techniques of this disclosure.

FIG. 2 is a diagram representing a data file 200 containing records related to health insurance claims in accordance with some techniques of this disclosure. Each of rows 202A, 202B, 202C, and 202D (collectively, "rows 202") contains a record of a health insurance claim. Continuing the "Jane Doe"/"Jane Smith" example from above, the specific patient may change her name back from "Jane Smith" to "Jane Doe." In the example of FIG. 2, the specific patient may be the patient having patient ID of 123. Furthermore, in the example of FIG. 2, there are four claims and two versions of the patient's name. However, to correctly represent this situation in FHIR server 102 using a point-in-time architecture, file loader 110 should cause FHIR server 102 to create three version-resources for the specific patient's name, and without creating a version-resource for the version of the specific patient's name shown in row 4.

FIG. 3 is a diagram showing an example resource hierarchy that maintains file chronological order and eliminates sequential repeats according to some techniques of this disclosure. Eliminating version-resources associated with sequential repeats may prevent "version bloat" in FHIR server 102 and may reduce communication between file loader 110 and FHIR server 102. In the example of FIG. 3, arrows point to child resources. The resources in FIG. 3 are based on rows 202 of data file 200. Thus, the resources include a patient resource 300 specifying patient ID "123." The resources also include "patient name" resources 302, 304, and 306 specifying different versions of the patient's name. Furthermore, the resources include "claim" resources 308, 310, 312, and 313 that specify claim IDs of different claims filed by the patient. Note that because the patient's name in row 202D is a sequential duplicate of the patient's name in row 202C, the resources do not include a separate "patient name" resource for "claim" resource 314. Instead, there is relationship data indicating the "claim" resource 314 (which originates from row 202D) is a parent of the same "patient name" resource as "claim" resource 312 (which originates from row 202C). In this way, the "version bloat" that would occur if a new "patient name" resource were created for row 202D is avoided.

As noted above, resources may be stored in a hierarchical data store. In the example of FIG. 3, "patient" resource 300 has a lower level in the hierarchy than "patient name" resources. "Patient name" resources have a lower level in the hierarchy than "claim" resources. To generalize, a first-level resource may be lower in the hierarchy than a second-level resource, a second-level resource may be lower in the hierarchy than a third-level resource, and so on.

There are two ways to identify resources in FHIR. The first way to identify a resource is a URL that identifies where the resource can be accessed. The URL is based on a FHIR logical ID for the resource. The FHIR logical ID for a resource may be assigned to the resource by a FHIR server (e.g., FHIR server 102) responsible for storing the resource or may be assigned by a client (e.g., one of computing systems 107).

The second way to identify a resource is a "business identifier" that is an inherent part of the resource and remains fixed as the resource is copied or moved. Thus, a resource may have a business identifier when the resource is stored in a flat file and when the resource is stored in a FHIR server (e.g., FHIR server 102). Business identifiers may also be referred to herein as "unique IDs." In some examples of this disclosure, resources may be required to have business identifiers so that file loader 110 may reconcile the resource as the resource is stored in a flat file with the resource as the resource is stored in FHIR server 102. In the example of FIG. 2, "patient ID" and "claim ID" may be examples of "business identifiers." The FHIR logical ID of a resource may act as a "primary key" assigned by FHIR server 102 and the business identifier of the resource may act as a "natural key." Business identifiers and FHIR logical IDs may have any string format. The string format may be assigned by a source healthcare system or other entity. In an example where a resource is a healthcare provider, a business identifier of the resource may be a National Provider Identifier (NPI) of the healthcare provider.

Allowing FHIR server 102 to assign FHIR logical IDs to resources may allow the process of loading data (e.g., resources) into FHIR server 102 to remain lightweight, e.g., because unique identifiers in the file may not be FHIR compliant and would have to be converted to FHIR compliant IDs. Maintaining non-FHIR compliant unique identifiers would require an additional persistent datastore so that future updates from files would resolve to the same FHIR logical IDs that were used when a resource was first created. However, by allowing FHIR server 102 to assign logical IDs, there is no external datastore required.

As noted above, FHIR is an industry standard for exchanging healthcare data between computing systems regardless of how the healthcare data is stored in those computing system. Such computing systems often exchange healthcare data in the form of flat files. A flat file may be a file in which records are stored in a uniform format with no structures for indexing or recognizing relationships between records. In contrast, in a hierarchical data store, data is explicitly organized into a tree-like structure. Conventional systems for loading flat files into data storage systems, such as FHIR servers, are built for initial loading of data and not incremental updates to the stored data. The ability to incremental load data into FHIR server 102 may be advantageous, especially with respect to chronologically ordered data, such as data that is applicable for specific points in time.

In accordance with techniques of this disclosure, file loader 110 may configured to load flat file data into FHIR server 102 on an ongoing basis (e.g., daily, weekly, monthly, etc.). The techniques implemented by file loader 110 may optimize over-the-wire communication with FHIR server 102 and may maintain referential integrity in the data. In other words, file loader 110 may be used for incremental data feeds in addition to initial bulk data load. Moreover, file loader 110 may load multiple files and/or multiple records concurrently. Thus, in a concurrent environment, all resources contained in the flat files are loaded into FHIR server 102 consistent with a "point-in-time" architecture while maintaining chronological order in an efficient manner.

As described herein, file loader 110 may obtain data files, such as flat files, from one or more of computing systems 107. For instance, file loader 110 may obtain a data file from a computing system of a healthcare provider. The data file may comprise a plurality of rows. Each of the rows includes at least a first column and a second column. For each of the rows, the first column of the row may contain a first-level resource ID (e.g., a patient ID) that identifies a first-level resource, such as a patient. The second column of the row may contain a data element (e.g., a patient name) that provides information regarding the first-level resource. File loader 110 may identify a set of unique first-level resource IDs that includes only unique first-level resource IDs contained in the first column of the rows. File loader 110 may initiate a plurality of threads. For each respective first-level resource ID in the set of unique first-level resource IDs, the threads include a thread assigned to the respective first-level resource ID. For each respective first-level resource ID in the set of unique first-level resource IDs, file loader 110 may identify a row set for the respective first-level resource ID that comprises rows of the data file that contain the respective first-level resource ID. For at least one row of the identified row set for the respective first-level resource ID (and in some examples for each row of the row set other than a first row of the identified row set), file loader 110 may determine whether the data element in the second column of the row is different from the data element in the second column of a predecessor row for the row. The predecessor row for the row may precede the row in the identified row set for the respective first-level resource ID. In some examples, the predecessor row may precede the row in the identified row set. In response to determining that the data provided by the data element in the second column of the row is different from the data element in the second column of the predecessor row for the row, file loader 110 may enqueue the row in a queue for the thread assigned to the respective first-level resource ID. For each respective thread of the plurality of threads that is assigned one of the first-level resource IDs, the respective thread may be configured to, for each row enqueued in the queue for the respective thread, dequeue the row from the queue for the respective thread. The respective thread may cause a server to create a second-level resource that stores a version of the data element contained in the second column of the dequeued row. For example, the respective thread may send request that causes the server to create, in a hierarchical data store, a new second-level resource that stores a version of the data element contained in the second column of the dequeued row. Additionally, the thread may send a request that causes the server to create, in the hierarchical data store, relationship data for the new second-level resource that specify that the new second-level resource is a parent of a relevant first-level resource for the new second-level resource, wherein the relevant first-level resource for the new second-level resource is identified by a first-level resource ID contained in the first column of the dequeued row. This process may enable the threads to operate in parallel, may enable incremental updates while maintaining a point-in-time architecture, and may help to avoid version bloat.

Figure 4:
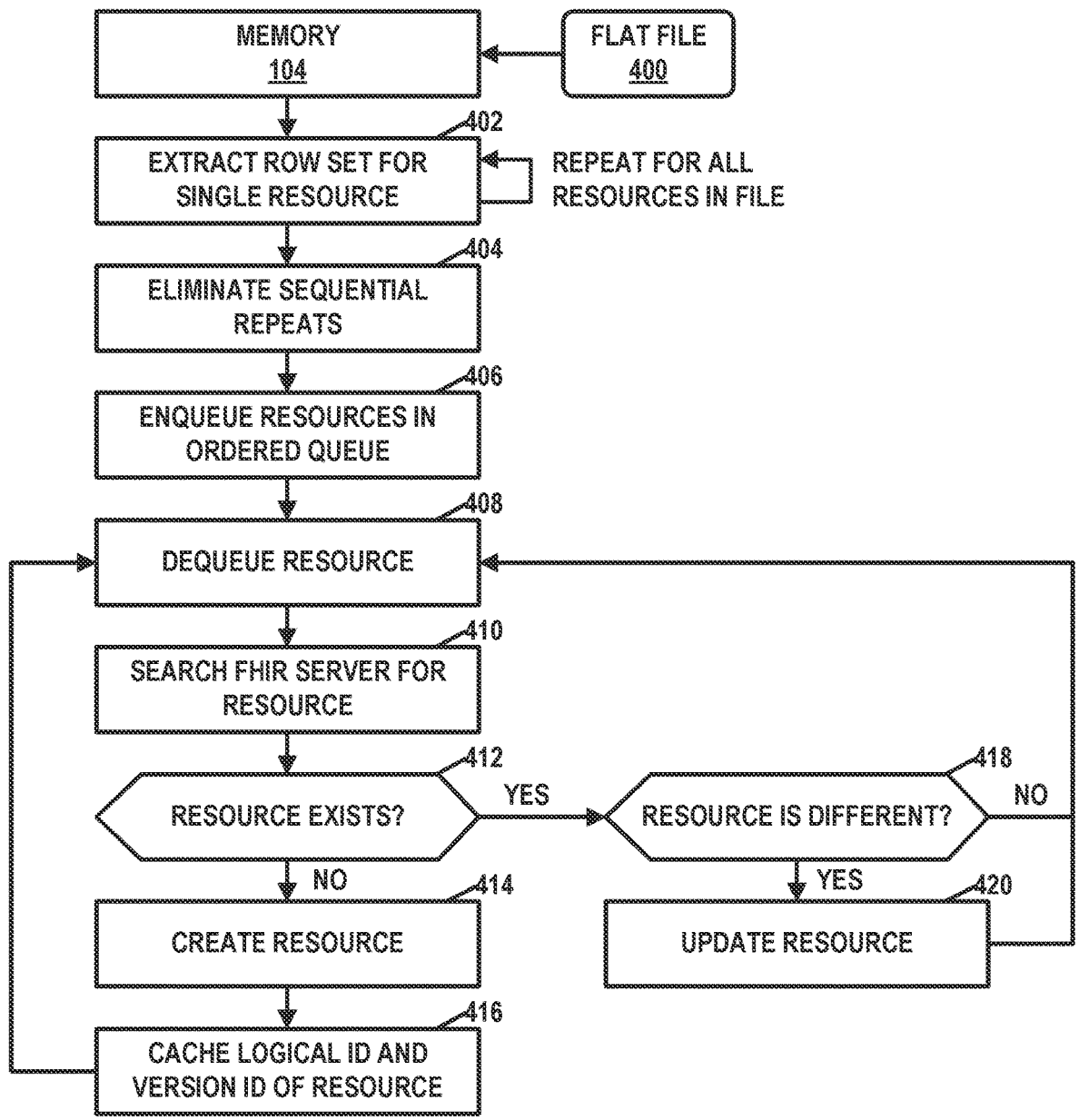
FIG. 4 is a flowchart illustrating an example operation of a file loader according to some techniques of this disclosure.

FIG. 4 is a flowchart illustrating an example operation of file loader 110 according to some techniques of this disclosure. In the example of FIG. 4, file loader 110 may load a flat file 400 into memory 104. Additionally, file loader 110 may extract a row set in flat file 400 corresponding to a single resource ID, such as an individual patient ID (402). The row set for a resource ID may include the rows of flat file 400 that include the resource ID. For example, in an example where the resource IDs are patient IDs identify patients, like in the example of FIG. 2, file loader 110 may extract a row set for each unique patient ID in flat file 400. File loader 110 may repeat this process for each type of resource ID in flat file 400. For instance, file loader 110 may repeat this process for patient IDs and also for claim IDs.

Furthermore, file loader 110 may eliminate sequential repeats (404). For example, in the context of FIG. 2 and FIG. 3, file loader 110 may eliminate the row specifying "Jane" and "Doe" because this row is a sequentially repeat of the third row.

File loader 110 may enqueue each row of a row set in an ordered queue for a thread assigned to one of the resource IDs (406). The thread may dequeue rows from the queue one at a time (408). When the thread dequeues a row from the queue, the thread may search FHIR server 102 for a resource identified by the resource ID of the dequeued row (410). For instance, the thread may use a REST API of FHIR server 102 to request the FHIR server 102 provide a response indicating whether a resource identified by the resource ID of the dequeued row exists at FHIR server 102. The request may specify a "business identifier" indicated in flat file 400 for the resource. For instance, in the example of FIG. 2, the request may specify the "patient ID" 123 indicated in data file 200.

Based on the search, file loader 110 may determine whether the resource exists at FHIR server 102 (412). For example, a resource may not exist at FHIR server 102 if the first time the resource occurs is in flat file 400.

If the resource does not exist in FHIR server 102 ("NO" branch of 412), the thread may request FHIR server 102 to create the resource (414). For example, the thread may use the REST API of FHIR server 102 to instruct FHIR server 102 to create the resource. When the resource is created, a FHIR logical ID may be assigned to the resource, e.g., by file loader 110 or FHIR server 102. A version identifier may also be assigned to the resource, e.g., by file loader 110 or FHIR server 102. The thread may cache the logical ID and version identifier of the resource, along with a row number of the dequeued thread, in a cache (416). For instance, if the thread is processing row 202A and patient resource 300 does not yet exist, the thread may request FHIR server 102 to create patient resource 300.

On the other hand, if the resource does exist at FHIR server 102 ("YES" branch of 418), file loader 110 may determine whether one or more data elements of the dequeued row are different from corresponding data elements associated with the resource at FHIR server 102 (418). If the data elements of the resource are different ("YES" branch of 418), the thread may update the resource at FHIR server 102 with the data elements of the dequeued row (420). For instance, the thread may use the REST API of FHIR server 102 to instruct FHIR server 102 to create new resources that store the updated data elements of the dequeued row. For instance, if the dequeued row is row 202B of FIG. 2, the thread may request FHIR server 102 create new name resources (e.g., resource 304) to store the updated name elements of row 202B. If the data elements of the dequeue row are not different ("NO" branch of 418), the thread does not update the resource. Rather, if the data elements of the resource are not different, or after creating or updating the resource, the thread may dequeue a next resource from the head of the queue (408).

Figure 5:
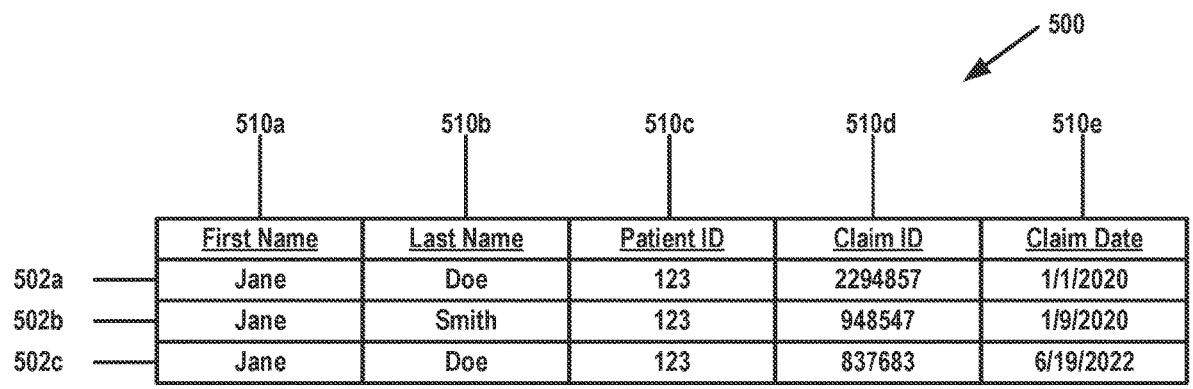
FIG. 5 is diagram illustrating an example of a data file suitable for storing FHIR data, according to some techniques of this disclosure.

FIG. 5 is a diagram illustrating an example of a data file 500 suitable for storing FHIR data, according to some techniques of this disclosure. In the example of FIG. 5, data file 500 stores claim data, e.g., data relating to health insurance claims. Data file 500 is defined by a format that includes rows and columns. For example, as shown in an example in FIG. 5, data file 500 includes rows 502a, 502b, 502c (collectively, "rows 502"), and columns 510a, 510b, 510c, 510d, 510e (collectively, "columns 510"). Each of rows 502 of data file 500 represents an entry of data in data file 500 (i.e., a record). Each cell in data file 500 may be a "data element." Each of columns 510 of data file 500 represents a type of information in that respective column for each row, such as, but not limited to, patient first name, patient last name, patient address, patient identifier (ID), claim ID, provider ID, provider name, birth date, name of insurance provider, unique business ID, and claim date. Any other patient-related data may be a column as well. While the example of FIG. 5 shows data file 500 including three rows 502a, 502b, and 502c, data file 500 may include any number of rows. While the example of FIG. 5 shows data file 500 including five columns 510a, 510b, 510c, 510d, 510e, data file 500 may include any number of columns.

In some examples, each of row 502 of data file 500 may include a business identifier (ID) for a patient resource, such as patient ID 510c, and a plurality of other types of information, such as first name 510a, last name 510b, claim ID 510d and claim date 510e.

Data file 500 is an example of a flat file. Flat files, such as data file 500, may be denormalized representations of hierarchical data. In a "normalized" representation of hierarchical data, the same piece of information is not copied multiple times. In contrast, in a denormalized file the same piece of may be repeated in multiple located (e.g., patient ID in FIG. 5) for purposes of keeping related information together. A single line (row) in data file 500 may contain multiple resources. For example, Patient ID, Claim ID, and Provider data (not shown) all on one row may each be resources. Additionally, a single patient may have many claims in a file. In the example of FIG. 5, because each row corresponds to a different claim, "claim" may be a parent resource and "patient" may be a child resource. There may be multiple versions of the patient resource with slowly changing dimensions (name change, address change, etc.).

There are two primary methods for file loader 110 to process the data in a flat file, such as data file 500, for loading into FHIR server 102: horizontal processing and vertical processing. In horizontal processing, file loader 110 breaks a single row into its separate elements (e.g., first name, last name, patient ID, claim ID, claim date, etc.). For each row, file loader 110 may then process the elements in hierarchical order (e.g., patient then claim) in a concurrent, multi-threaded manner. In horizontal processing, file loader 110 processes one row of a flat file at a time and can concurrently process the flat file by delegating a thread (from a thread pool) per row of the flat file. Thus, different threads may concurrently process different rows. File loader 110 may break down each row into the hierarchical components and may load the hierarchical components into FHIR server 102 in proper parent-child order (e.g., patient, then claim). A flaw in horizontal processing is that in a multi-threaded system, it may be difficult to maintain proper version and chronological order. For example, thread 2 might get scheduled before thread 1 and thread order cannot be controlled by the program. Rather, it may be up to a task scheduler to decide thread processing order.

For instance, in FIG. 5, thread 1 may process row 502A, thread 2 may process row 502B, and thread 3 may process row 502C. Without synchronization logic, thread 3 might get scheduled before thread 1 and 2; and row 3 would become version 1 of the patient because FHIR server 102 may assign version numbers based on the order they are created. It may be difficult to synchronize the threads so that, due to the same patient in all 3 rows, the rows should be processed in thread 1, 2, 3 order. File loader 110 may tell thread 1 to process patient 1 (with a name of "Doe") and may tell thread 2 not to finish processing patient 2 (with a name of "Smith") after the thread 1 processing routine runs to completion. However, it may not work that way since there are many factors that affect task/thread scheduling and given the fact that the "create or update" operation is not atomic in FHIR (e.g., file loader 110 must first search then create or update). Hence, thread 2 may complete before thread 1. In which case, the version order is not maintained, i.e., patient 1 "Doe" is now the most recent version of patient 1. Therefore, horizontal processing may require additional thread synchronization to ensure that thread 2 blocks until thread 1 completes when both threads detect that they are working on the same resource (patient 1).

There is another flaw in the horizontal processing approach. Because file loader 110 is responsible for processing one row at a time, it is more difficult to perform deduplication as described above without a cache memory structure. Imagine in FIG. 5 that patient 1 (with a name of "Smith") also has a fourth claim on the last row in the file and the other two rows have already been processed correctly. In this case, Patient 1 (with the name of "Smith") has already been loaded into FHIR server 102 and no processing is required. The claim from the row can reference version 2 of Patient 1 ("Smith") and version 3 is not required. No other thread is processing patient 1 updates at that time, so there is no contention. But the routine will not "know" that patient 1 has already been processed by a previous thread. At this point, in FHIR server 102, Jane Doe=V1 and Jane Smith=V2 and all threads are working on subsequent rows of data.

Then another row with the patient's ID and the name of "Jane Smith" may appear in the flat file. In this case, the patient data is the same as V2 and no patient processing is required. The new claim can reference V2 of patient 1. However, with horizontal processing, the routine would need a memory structure to "remember" that previous information or contact FHIR server 102 to determine if "Jane Smith" has already been loaded in proper state, but that would require network communication that should be minimized.

Vertical processing may be defined as processing one resource at a time, starting with the lowest child in a hierarchy, then moving to the next level in the hierarchy and so forth. In other words, vertical processing may be defined by extracting a collection of patients (children) from each row first and ensuring all the patients are loaded into FHIR server 102 before moving up the hierarchy to the parents (claims). This extraction may occur in step 402 of FIG. 4.

Figure 6:
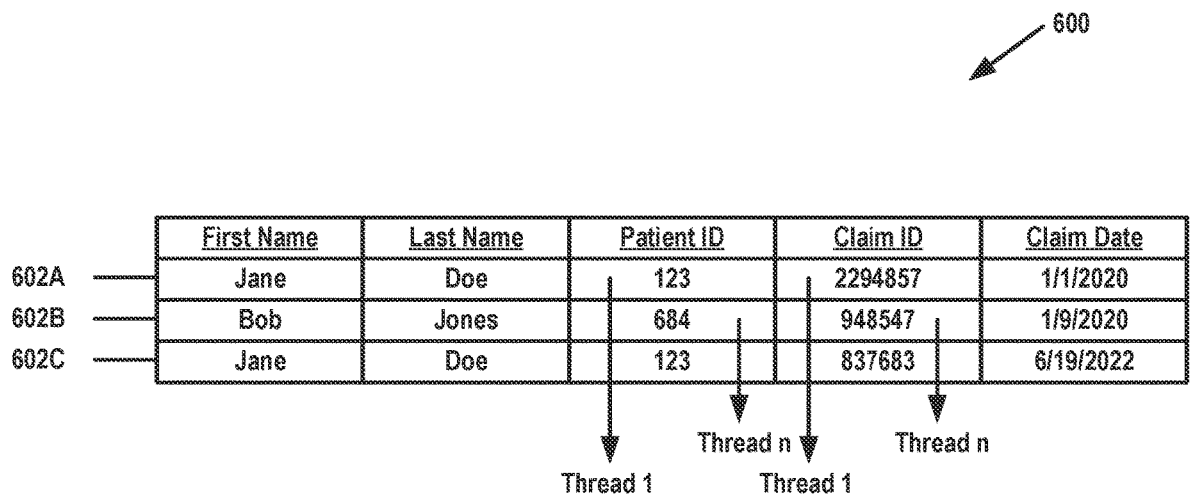
FIG. 6 is a diagram illustrating vertical processing of a data file, according to some techniques of this disclosure.

FIG. 6 is a diagram illustrating vertical processing a data file 600, according to some techniques of this disclosure. An advantage of vertical approach is that a single collection of patients may be easy to sequentially deduplicate in a single pass. Additionally, thread synchronization can be tackled using an ordered queue of resources (e.g., as described in steps 406 and 408 of FIG. 4) to ensure order is maintained for slowly changing dimension data. In FIG. 6, thread 1 has been queued with work for patient 1 (i.e., the patient having patient ID 123) (ordered correctly) and thread 2 has been queued with work for patient 2 (i.e., the patient having patient ID 684). Thread 1 and 2 do not need to be synchronized because the threads are always guaranteed to work on different patients. The threads may process child resources first and then parent resources.

Figure 7:
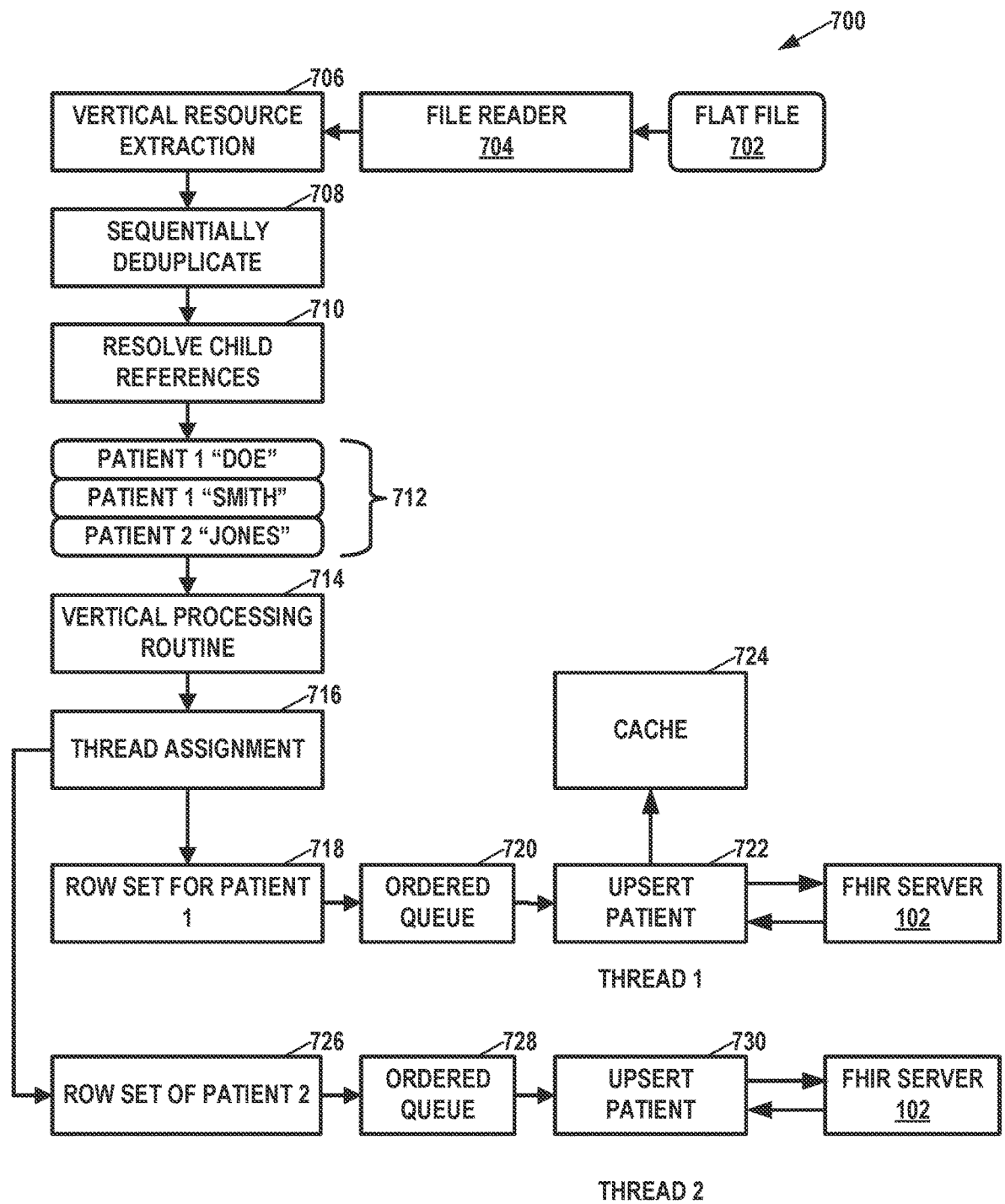
FIG. 7 is a block diagram illustrating an example process using ordered queues per thread, according to some techniques of this disclosure.

FIG. 7 is a block diagram illustrating an example process using ordered queues per thread, according to some techniques of this disclosure. Although FIG. 7 is described with respect to patient resources as first-level resources and patient names as second-level resources, FIG. 7 may be applicable to other types of resources. In the example of FIG. 7, a file reader process 700 of file loader 110 loads a flat file 702 into a memory (e.g., memory 104). File loader 110 may then perform vertical resource extraction (706). For example, file loader 110 may scan vertically through the entries in flat file 702 to identify a set of unique patient IDs in flat file 702. The set of unique patient IDs may be defined as including only unique patient IDs contained in a column of the rows that contains patient IDs. For instance, in the example of FIG. 6, the set of unique patient IDs is: 123 and 684.

For each respective patient ID in the set of unique patient IDs, file loader 110 may perform sequential deduplication (708). In other words, among rows that contain to the same patient ID, file loader 110 may, in effect, remove a row from processing by a process that creates a new resource for the row if data elements in columns of the row subordinate to the column containing the patient ID are not different from data elements in corresponding subordinate columns of a predecessor row. For example, if two sequential rows in file loader 110 are in the row set of patient ID 123 and both of the rows have data elements specifying a patient's name is "Jane Doe," file loader 110 may remove the second-occurring of the two rows from processing by a process that creates new "patient name" resources for the rows.

In another example, flat file 702 may include rows associated with a patient resource for "patient 1." The rows associated with the patient resource for patient 1 may include a first row indicating patient 1's name is "James," a second row indicating that patient 1's name is "Jim," a third row indicating that patient 1's name is "Jim," a fourth row indicating that patient 1's name is "Jim," and a fifth row indicating that patient 1's name is "James." Full deduplication would result in there being only two "name" resources to represent the two versions of patient 1's name. This may be referred to as "de-bouncing" or "deduplicating." However, full deduplication may, in some examples, require file loader 110 to query FHIR server 102 to compare each data element to each version of the "name" resource associated with the patient 1 resource. In some examples, full deduplication may be performed in memory at file loader 110, which may increase the complexity of file loader 110.

Sequential deduplication (as opposed to full deduplication) may balance the priorities of reducing the number of requests to FHIR server 102 with reducing complexity of file loader 110. In the "James"/"Jim" example of the previous paragraph, the sequential deduplication process would not query FHIR server 102 for "Jim" resources of the third and fourth rows but would result in the creation of a new "name" resource indicating that patient 1's name is "James" as indicated in the fifth row. Thus, in this example, there would be three "name" resources indicating different versions of the name of patient 1: a first "name" resource indicating patient 1's name is "James," a second "name" resource indicating patient 1's name is "Jim," and a third "name" resource indicating patient 1's name is "James." Thus, version bloat is reduced relative to an implementation in which there would be five version-resources for patient 1's name. At FHIR server 102, each of the first, second, and third "name" resources may have the same logical ID and different version IDs. The first, second, and third "name" resources having the same logical ID may be helpful in handling queries that request all versions of patient 1's name.

Additionally, file loader 110 may resolve child references of rows in the row set for a patient ID (710). For example, before requesting FHIR server 102 to create a resource, file loader 110 may need to resolve the references to child resources of the resource by logical ID and version ID. For example, "claim" resources may be higher-order resources than "patient name" resources (which are higher-order resources than "patient resources). In this example, when creating a new "claim" resource, file loader 110 may need to determine the logical ID and version ID of a "patient name" resource so that file loader 110 can instruct FHIR server 102 to create a relationship between the new "claim" resource and the "patient name" resource. As described in greater detail below, file loader 110 may use a cache to determine the logical ID and version ID of the "patient name" resource.

As a result, file loader 110 may obtain data 712 containing deduplicated and resolved elements of rows. File loader 110 may then perform a vertical processing routine 714 that uses data 712. Vertical processing routine 714 processes row sets of respective unique "patient" resources. For instance, in the example of FIG. 7, the row set collected by vertical processing routine 714 for patient 1 includes rows that indicate that patient 1's name is "Doe" and rows that indicate that patient 1's name is "Smith." A row set collected by vertical processing routine 714 for patient 2 includes the row that indicates that patient 2's name is "Jones."

A thread assignment algorithm 716 of file loader 110 may assign unique patient IDs to different threads in a plurality of threads. In other words, for each respective patient ID in the set of unique patient IDs, the threads may include a thread assigned to the respective patient ID. Thus, thread assignment algorithm 716 may assign patient 1 (718) to thread 1 and may assign patient 2 (726) to thread 2, and so on. In some examples, thread assignment algorithm 716 assigns resources (e.g., patient resources) to the appropriate threads based on the resource unique identifier of resources. In the examples where the resources are "patients," the unique business identifier may be "patient ID." As described earlier, each resource may require a unique business identifier assigned by a system (e.g., a healthcare system) that generates the flat file. Given that each resource has a unique business identifier, thread assignment algorithm 716 may use the following equation to determine a thread number to which a resource should be assigned.

Integer
threadNumber=resource.uniqueIdentifier.hashCode( ) % threadPool.size( )

For each of the patient resources, file loader 110 may enqueue each row in the row set for the patient resource in an ordered queue for the thread assigned to the patient resource. The thread may then dequeue a row from the ordered queue and perform an upsert operation based on the dequeued entry. The upsert operation may add a new resource and or merge any changes to remaining (non-removed) elements of row and update FHIR server 102 accordingly. The upsert operation may involve creation of a new resource. For example, if a "patient" resource associated with the "patient ID" of the dequeued row does not exist at FHIR server 102, the "patient" resource may be created. If a "patient" resource associated with the "patient ID" of the dequeued row does exist a FHIR server 102 and there are updates to subordinate data elements (e.g., patient name), the upsert operation may include creation of one or more new resources to store the updated versions of the data elements. The thread or FHIR server 102 may assign a new logical ID and version ID to the new resources. The upsert operation may also include creation of relationship data indicating a relationship of the new resources to child or parent resources. For example, if the resource here is patient 1, the subordinate data element of the dequeued row indicates that patient 1's name is "Jones," and the current version of the "patient name" resource at FHIR server 102 indicates that patient 1's name is "Smith," a new "patient name" resource is created indicating that patient 1's name is "Jones."

The thread may insert the row number of the dequeued row, a logical ID of the resource, and version ID of the resource into a cache 724. As discussed elsewhere in this disclosure, data stored in the queue may be used when processing higher-level resources. The thread may repeat the process of dequeuing and processing rows until the ordered queue for the thread is empty.

As noted above, the thread may insert a logical ID of the resource into logical ID cache 724. The user of logical ID cache 724 may reduce network round trips to and from file loader 110 to FHIR server 102. As a thread loads a resource (e.g., patient resources) into FHIR server 102, file loader 110 stores a FHIR logical ID of the resource and a version ID of the resource into logical ID cache 724.

Thus, in the example of FIG. 7, file loader 110 may enqueue rows of the row set for patient 1 (718) into an ordered queue 720 for thread 1. Thread 1 may dequeue rows from ordered queue 720 and perform an upsert operation 722 on the dequeued row. Similarly, file loader 110 may enqueue rows of the row set for patient 2 (726) into an ordered queue 728 for thread 2. Thread 2 may dequeue rows from ordered queue 728 and perform an upsert operation 730 on the dequeued row.

Figure 8A:
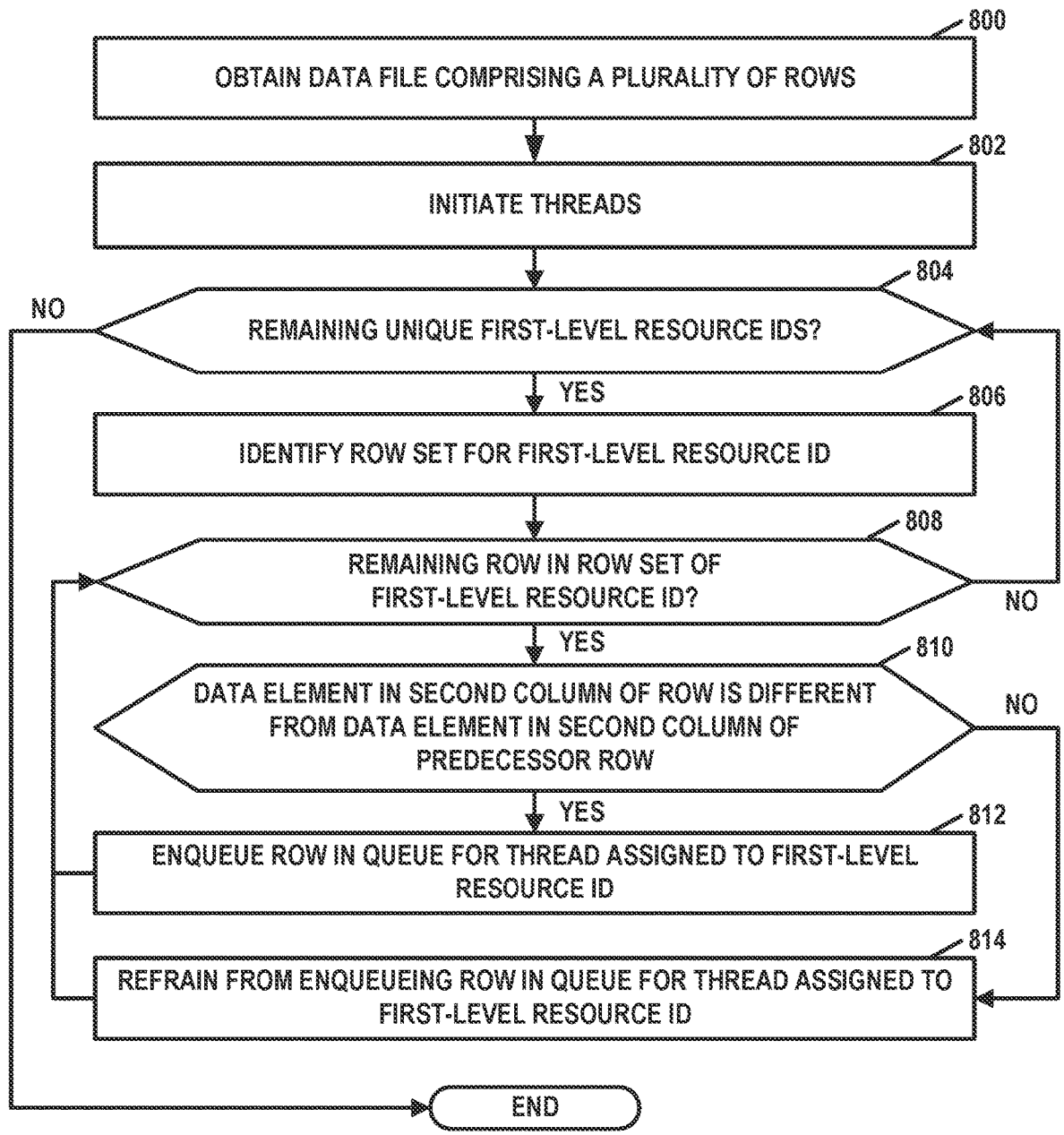
FIG. 8A is a flowchart illustrating an example operation of a file loader according to some techniques of this disclosure.

FIG. 8A is a flowchart illustrating an example operation of file loader 110 according to some techniques of this disclosure. In the example of FIG. 8A, file loader 110 may obtain a data file, such as data file 200 or data file 500 (800). In some examples, the data file may be stored in a memory, such as memory 104 (FIG. 1). The data file may include a plurality of rows. Each of the rows includes at least a first column and a second column. For each of the rows, the first column of the row contains a first-level resource ID that identifies a first-level resource, such as a patient. The second column of the row may contain a data element that provides information regarding the first-level resource. In some examples, the first-level resource ID is a patient ID, the first-level resource is a patient, and the data element provides information such as patient first name, patient last name, patient address, or patient birth date. In another example, the first-level resource ID is a provider ID, the first-level resource is a provider, and the data element provides information such as a provider name or a provider address. A set of unique first-level resource IDs may be defined as including only unique first-level resource IDs contained in the first column of the rows. It should be appreciated that the terms such as first column, second column, etc. are merely used to differentiate columns and do not imply and order or position within the file. Similarly, first-level resource, second-level resource, third-level resource, etc. are merely used to differentiate resources and do not necessarily imply positions in a hierarchy.

Additionally, in the example of FIG. 8A, file loader 110 may initiate a plurality of threads (802). For each respective first-level resource ID in the set of unique first-level resource IDs, the threads include a thread assigned to the respective first-level resource ID. For instance, in the example of FIG. 6, the set of unique first-level resource IDs may be "123" and "684".

File loader 110 may determine whether there are any remaining first-level resource IDs in the set of unique first-level resource IDs (804). If there is a first-level resource IDs in the set of unique first-level resource IDs ("YES" branch of 804), file loader 110 may identify a row set for the first-level resource ID that comprises rows of the data file that contain the first-level resource ID (806). For instance, in the example of FIG. 6, the row set for the first-level resource ID "123" may include rows 602A and 602C.

Furthermore, file loader 110 may determine whether there are any remaining rows in the row set for the first-level resource ID (808). If there is a remaining row in the row set for the first-level resource ID ("YES" branch of 808), file loader 110 may determine whether the data element in the second column of the row is different from the data element in the second column of a predecessor row for the row (810). The predecessor row for the row may precede (e.g., immediately or separated by one or more rows in the row set) the row in the identified row set for the respective first-level resource ID. For instance, in the example of FIG. 6, the predecessor row for row 602C is row 602A. In this example, it is assumed that the first column is subordinate to the second column in the sense that the second column provides changeable information regarding the resource identified in the first column.

In response to determining that the data provided by the data element in the second column of the row is different from the data element in the second column of the predecessor row for the row ("YES" branch of 810), file loader 110 may enqueue the row in a queue for the respective thread assigned to the first-level resource ID (812). Otherwise, if the data provided by the data element in the second column of the row is not different from the data element in the second column of the predecessor row for the row ("NO" branch of 810), file loader 110 may refrain from enqueueing the respective row in the queue for the thread that corresponds to the respective ID (814). The respective thread may be configured to, for each row enqueued in the queue for the respective thread, dequeue the row from the queue for the respective thread and cause a server to create a second-level resource that stores a version of the data element contained in the second column of the dequeued row.

In either case, file loader 110 may again determine whether there are remaining rows in the row set for the first-level resource ID (808). In this way, file loader 110 may perform actions (810) and (812) for at least one row of the identified row set for the respective first-level resource ID. If there are no remaining rows in the row set for the first-level resource ID ("NO" branch of 808), file loader 110 may again determine whether there are any remaining unique first-level resource IDs (804). In this way, file loader 110 may perform actions (806)-(814) for each respective first-level resource ID in the set of unique first-level resource IDs. If there are no remaining unique first-level resource IDs ("NO" branch of 804), the process may end. Alternatively, file loader 110 may repeat the process of FIG. 8A with a higher-level resource (e.g., a second-level resource, such as a health insurance claim) instead of the first-level resource. In some examples, different threads assigned to the first-level resource IDs may operate in parallel to perform actions (806)-(814) for different unique first-level resources.

Figure 8B:
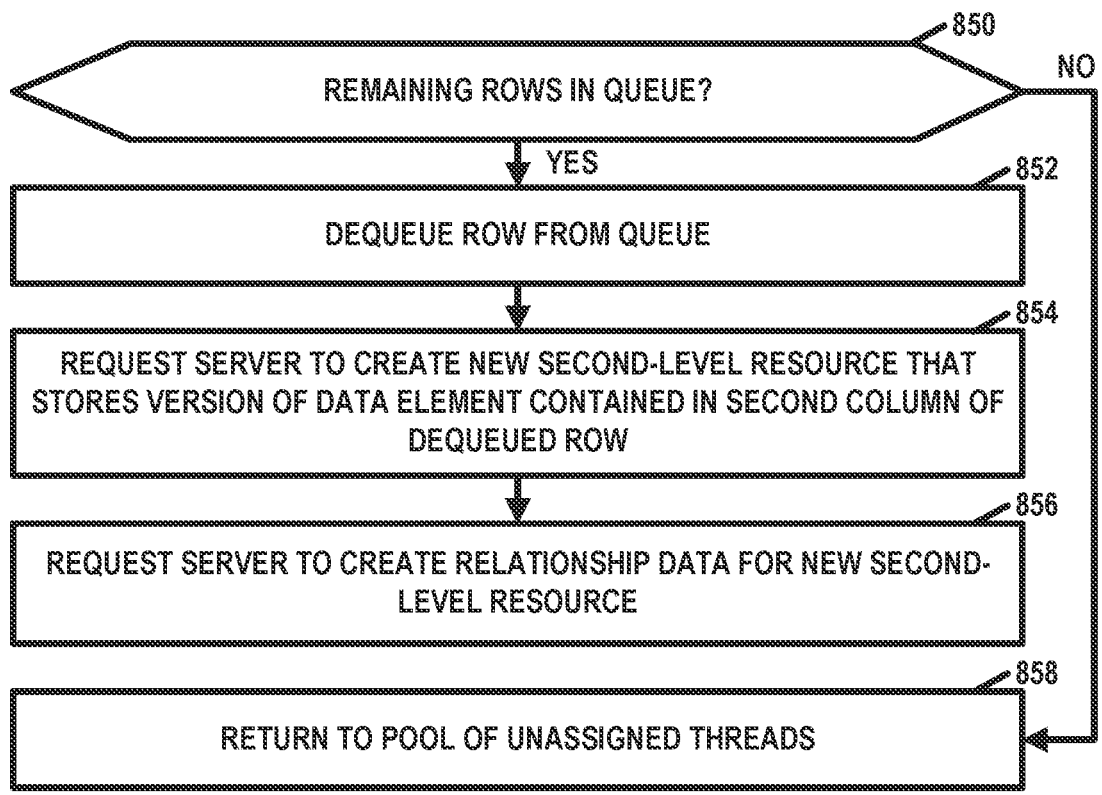
FIG. 8B is a flowchart illustrating an example operation of a thread according to some techniques of this disclosure.

FIG. 8B is a flowchart illustrating an example operation of a thread according to some techniques of this disclosure. FIG. 8B is a continuation of the process started in FIG. 8A. The operation shown in FIG. 8B may performed by each respective thread of the plurality of threads that is assigned one of the first-level resource IDs. Specifically, for each row enqueued in the queue for the thread, the thread may determine whether there are any remaining rows in the queue for the thread (850). If there is a row remaining in the queue for the thread ("YES" branch of 850), the thread may dequeue the row from the queue for the respective thread (852). Additionally, the thread may request a server (e.g., FHIR server 102) to create, in a hierarchical data store, a new second-level resource that stores a version of the data element contained in the second column of the dequeued row (854).

Additionally, the thread may request the server to create relationship data for the new second-level resource that specify that the new second-level resource is a parent of a relevant first-level resource for the new second-level resource (856). The relevant first-level resource for the new second-level resource may be identified by a first-level resource ID contained in the first column of the dequeued row. For example, in the context of FIG. 3, the new second-level resource may be resource 304 and the relevant first-level resource may be resource 300.

In some examples, the thread may obtain (e.g., from the server or from logical ID cache 724) a logical ID of the relevant first-level resource for the new second-level resource and a version ID of the relevant first-level resource for the new second-level resource. Additionally, the thread may obtain, from the server, a logical ID of the new second-level resource and a version ID of the new second-level resource. The relationship data for the new second-level resource specifies that the new second-level resource is the parent of the relevant first-level resource for the new second-level resource by specifying: (1) the logical ID of the new second-level resource and the version ID of the new second-level resource and (2) the logical ID of the relevant first-level resource for the new second-level resource and the version ID of the relevant first-level resource for the new second-level resource. In the context of FIG. 3, where the new second-level resource is resource 304 and the relevant first-level resource is resource 300, the relationship data for the new second-level resource may be represented by the line between resource 304 and resource 300.

The thread may then determine again whether there are remaining rows in the queue for the thread (850). If there a no remaining rows in the queue for the thread ("NO" branch of 850), the thread may return to a pool of unassigned threads (858). In other examples, the thread may wait for additional rows to be added to the queue for the thread.

As mentioned above, after determining that there are no remaining unique first-level resource IDs to process in the data file (e.g., "NO" branch of 804), file loader 110 may start to process resources IDs for higher-level resources in the data file. For instance, in the context of FIG. 6, file loader 110 may start processing claim IDs. Similarly, in the context of FIG. 3, file loader 110 may start to process claim resources 308, 310, 312, and 314. To support processing of higher-level resources, file loader 110 may need to resolve child references, e.g., as described with respect to action 710 of FIG. 7. Resolving child references may involve the use of logical ID cache 714.

Thus, to continuing the example of FIGS. 8A and 8B with respect to a higher-level resource (i.e., a third-level resource), the operation of FIG. 8B may further include storing a row number of the dequeued row, the logical ID of the new second-level resource, and the version ID of the new second-level resource in a cache (e.g., logical ID cache 714). Furthermore, each of the rows in the data file may further include a third column that contains a third-level resource ID that identifies a third-level resource. For instance, in the context of FIG. 2, the third column is the "claim ID" column, the third-level resource IDs are claim IDs, and the third-level resources are claims. A set of unique third-level resource IDs may be defined as including only unique third-level resource IDs contained in the third column of the rows. For each respective third-level resource ID in the set of unique third-level resource IDs, the threads may include a thread assigned to the respective third-level resource ID.

For each respective third-level resource ID in the set of unique third-level resource IDs, file loader 110 may identify a row set for the respective third-level resource ID that comprises rows of the data file that contain the respective third-level resource ID. File loader 110 may then perform a sequential deduplication process in the row set for the respective third-level resource ID. For example, for each respective row of the row set for the respective third-level resource ID, file loader 110 may determine whether data contained in any subordinate column of the respective row is different from data contained in a corresponding subordinate column of a predecessor row for the respective row. The predecessor row for the respective row precedes (e.g., immediately precedes) the respective row in the row set for the respective third-level resource ID. Subordinate columns of a given column may be columns that contain data elements that provide changeable information regarding resource associated with the element identified in the given column. In the example of FIG. 2, the "first name," "last name," "patient ID," and "claim date" columns may be subordinate to the "claim ID" column.

In response to determining that the data contained in any subordinate column of the respective row is different from the data contained in the corresponding subordinate column of the predecessor row for the respective row, file loader 110 may enqueue the respective row in a queue for the thread assigned to the respective third-level resource ID.

For each respective thread of the plurality of threads that is assigned one of the third-level resource IDs, the respective thread is configured to, for each row enqueued in the queue for the respective thread, dequeue the row from the queue for the respective thread. The respective thread may then use a row number of the dequeued row to search the cache to obtain a logical ID of a relevant second-level resource and version ID of the relevant second-level resource. For instance, in the example of FIG. 2 and FIG. 3, the respective thread may dequeue row 202D from the queue. In this example, the respective thread may use the row number of the dequeued row (202D) to look up the logical ID and version ID of the relevant second-level resource. In this example, the relevant second-level resource may be resource 306. Note that the thread may use the cache in this scenario because there might not be a second-level resource at the hierarchical data store that corresponds to the dequeued row because the dequeued row might have been deduplicated when processing first-level resources.

Furthermore, the respective thread may send a request to the server that causes the server to create, in the hierarchical data store, a new third-level resource that specifies the third-level resource ID contained in the third column of the dequeued row. In the example of FIG. 3 and FIG. 4, where the dequeued row is row 202D, the new third-level resource may be resource 314. The thread may also obtain, from the server, a logical ID and a version ID of the new third-level resource. The respective thread may then a send a request to the server that causes the server to create, in the hierarchical data store, relationship data for the new third-level resource that specify that the new third-level resource is a parent of the relevant second-level resource by specifying the logical ID and version ID of the new third level resource and the logical ID and the version ID of the relevant second-level resource. In the example of FIG. 3 and FIG. 4, where the dequeued row is row 202D, the relationship data may indicate the link between resource 314 and resource 306. Note that in order to create this relationship, the respective thread may need to "know" the logical ID and version ID of resource 306. A new second-level resource was not created for row 202C because the first name and last name columns of row 202D and the predecessor row (row 202C) are the same.

Therefore, when a thread assigned to a first-level resource ID is processing rows and determines (e.g., in action 810) that the data element in the second column of the respective row is not different from as the data element in the second column of the respective row, the thread may obtain a logical ID of a predecessor second-level resource and a version ID of the predecessor second-level resource. The predecessor second-level resource is a second-level resource created for the predecessor row for the respective row. For instance, in the context of FIG. 2 and FIG. 3, if the respective row is row 202D, the predecessor row for the respective row is row 202C. The predecessor second-level resource is resource 306. The thread may store a row number of the respective row, the logical ID of the predecessor second-level resource, and the version ID of the predecessor second-level resource in the cache. For example, the thread may cache the row number of row 202D along with the logical ID and version ID of resource 306. Thus, when a thread assigned to the third-level resource ID 9384775 dequeues row 202D, the thread may be able to use the row number of row 202D to search the cache for a logical ID and a version ID. Because the row number, logical ID, and version ID were previously stored in the cache, the thread is able to access the logical ID and version ID of the second-level resource corresponding to row 202D. Thus, the thread is able to request creation of the relationship data specifying the logical ID and version ID of the new third-level resource for the dequeued row (i.e., resource 314) and the logical ID and version ID of the appropriate second-level resource for the dequeued row (i.e., resource 306). In this way, file loader 110 is able to maintain a point-in-time architecture that allows users to determine, e.g., the patient's name was "Jane Doe" at the time claim 9384775 was filed, without needing to create a duplicative patient-name/second-level resource for claim 9384775.

The following is a non-limiting list of examples that are in accordance with one or more techniques of this disclosure.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

In one or more examples, the functions described may be implemented in hardware, software, firmware, or any combination thereof. If implemented in software, the functions may be stored on or transmitted over a computer-readable medium as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers, processing circuitry, or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM, or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by processing circuitry (e.g., one or more processors, such as one or more DSPs, general purpose microprocessors, ASICs, FPGAs, or other equivalent integrated or discrete logic circuitry), as well as any combination of such components. Accordingly, the term "processor" or "processing circuitry" as used herein, may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A computing system comprising:
   a memory configured to store a data file comprising a plurality of rows each including a first column and a second column, wherein:
   for each row of the plurality of rows, the first column of the row contains a first-level resource identifier (ID), of a plurality of first-level resource IDs, that identifies a respective first-level resource, of a plurality of first-level resources, and the second column contains a data element, of a plurality of data elements, that provides information regarding the respective first-level resource; and
   one or more processors communicatively coupled to the memory, the one or more processors configured to:

initiate one or more threads assigned to one or more unique first-level resource IDs of the plurality of first-level resource IDs; and for each respective unique first-level resource ID of the one or more unique first-level resource IDs:
  identify a first row set that comprises one or more of the plurality of rows that contain the respective unique first-level resource ID; and
  for at least a first row of the first row set:
    determine whether a first data element in the second column of the first row is different from a second data element in the second column of a predecessor row from the first row set that precedes the first row;
    in response to determining that the first data element is different from the second data element, enqueue the first row in a first queue for a first thread, from the one or more threads, assigned to the respective unique first-level resource ID;
    dequeue the first row from the first queue for the first thread; and
    cause a server to create a second-level resource that stores a version of the first data element.

2. The computing system of claim 1, wherein the one or more processors cause the server to create the second-level resource by sending a request to the server, causing the server to create, in a hierarchical data store, the second-level resource.

3. The computing system of claim 1, wherein the one or more processors are further configured to send a request causing the server to create, in a hierarchical data store, relationship data for the second-level resource that specify that the second-level resource is a parent of a relevant first-level resource for the second-level resource, wherein the relevant first-level resource for the second-level resource is identified by a first-level resource ID, of the plurality of first-level resource IDs, contained in the first column of the first row.

4. The computing system of claim 3, wherein:
the first thread is configured to:
  obtain a first logical ID of the relevant first-level resource for the second-level resource and a first version ID of the relevant first-level resource for the second-level resource; and
  obtain, from the server, a second logical ID of the second-level resource and a second version ID of the second-level resource, and
wherein the relationship data for the second-level resource specifies that the second-level resource is the parent of the relevant first-level resource for the second-level resource by specifying: (1) the second logical ID and the second version ID and (2) the first logical ID and the first version ID.

5. The computing system of claim 4, wherein:
the second-level resource is a first second-level resource,
the first thread is further configured to store a row number of the first row, the second logical ID, and the second version ID in a cache,
each of the plurality of rows further includes a third column that contains a third-level resource ID that identifies a third-level resource,
a set of unique third-level resource IDs is defined as including only unique third-level resource IDs contained in the third column of the plurality of rows,
for each respective third-level resource ID in the set of unique third-level resource IDs, the one or more threads include a second thread assigned to the respective third-level resource ID, and the one or more processors are further configured to:
  identify a second row set for the respective third-level resource ID that comprises ones of the plurality of rows that contain the respective third-level resource ID;
  for at least a second row of the second row set:
    determine whether a third data contained in any subordinate column of the second row is different from a fourth data element contained in a corresponding subordinate column of a predecessor row for the second row, wherein the predecessor row for the second row precedes the second row in the second row set;
    in response to determining that the third data element is different from the fourth data element, enqueue the second row in a second queue for the second thread, and
  wherein the second thread is configured to, for each third row enqueued in the second queue:
    dequeue the third row from the second queue;
    use a row number of the third row to search the cache to obtain a third logical ID of a second-level resource and a third version ID of the second second-level resource;
    send a request causing the server to create, in the hierarchical data store, a third-level resource that specifies the third-level resource ID contained in the third column of the third row;
    obtain, from the server, a fourth logical ID and a fourth version ID of the third-level resource; and
    send a request causing the server to create, in the hierarchical data store, relationship data for the third-level resource that specify that the third-level resource is a parent of the second second-level resource by specifying the fourth logical ID and the fourth version ID and the third logical ID and the third version ID.

6. The computing system of claim 5, wherein, for a fourth row of the second row set, the one or more processors are further configured to, in response to determining that a fifth data element in the second column of the fourth row is not different from a sixth data element in the second column of the fourth row:
  obtain a fifth logical ID of a predecessor second-level resource and a fifth version ID of the predecessor second-level resource, the predecessor second-level resource being a second-level resource created for the predecessor row for the fourth row of the second row set; and
  store a row number of the fourth row of the second row set, the fifth logical ID, and the fifth version ID in the cache.

7. The computing system of claim 1, wherein two or more of the threads that are assigned to the unique first-level resource IDs operate in parallel.

8. The computing system of claim 1, wherein the server is a Fast Healthcare Interoperability Resources (FHIR) server.

9. The computing system of claim 1, wherein:
the plurality of first-level resource IDs includes a patient identifier, and the plurality of data elements provides information regarding one or more of patient first name, patient last name, patient address, or patient birth date, or the plurality of first-level resource IDs includes a provider ID, and the plurality of data elements provides information regarding one or more of a provider name, or provider address.

10. A computer-implemented method comprising:
obtaining, by one or more processors, a data file comprising a plurality of rows each including a first column and a second column, wherein:
for each row of the plurality of rows, the first column of the row contains a first-level resource identifier (ID), of a plurality of first-level resource IDs, that identifies a respective first-level resource, of a plurality of first-level resources, and the second column contains a data element, of a plurality of data elements, that provides information regarding the respective first-level resource;
initiating, by the one or more processors, one or more threads assigned to one or more unique first-level resource IDs of the plurality of first-level resource IDs; and
for each respective unique first-level resource ID of the one or more unique first-level resource IDs:
identifying, by the one or more processors, a first row set that comprises one or more of the plurality of rows that contain the respective unique first-level resource ID; and
for at least a first row of the first row set:
determining, by the one or more processors, whether a first data element in the second column of the first row is different from a second data element in the second column of a predecessor row from the first row set that precedes the first row;
in response to determining that the first data element is different from the data second element, enqueuing, by the one or more processors, the first row in a first queue for a first thread, from the one or more threads, assigned to the respective unique first-level resource ID;
dequeue the first row from the first queue for the first thread; and
cause a server to create a second-level resource that stores a version of the first data element.

11. The computer-implemented method of claim 10, wherein the first thread is configured to, as part of causing the server to create the second-level resource, send a request to the server, causing the server to create, in a hierarchical data store, the second-level resource.

12. The computer-implemented method of claim 10, wherein the first thread is configured to create, in a hierarchical data store, relationship data for the second-level resource that specify that the second-level resource is a parent of a relevant first-level resource for the second-level resource, wherein the relevant first-level resource for the second-level resource is identified by a first-level resource ID, of the plurality of first-level resource IDs, contained in the first column of the first row.

13. The computer-implemented method of claim 12, wherein:
the first thread is further configured to:
obtain a first logical ID of the relevant first-level resource for the second-level resource and a first version ID of the relevant first-level resource for the second-level resource; and
obtain, from the server, a second logical ID of the second-level resource and a second version ID of the second-level resource, and
wherein the relationship data for the second-level resource specifies that the second-level resource is the parent of the relevant first-level resource for the second-level resource by specifying: (1) the second logical ID and the second version ID and (2) the first logical ID and the first version ID.

14. The computer-implemented method of claim 13, wherein:
the second-level resource is a first second-level resource,
the first thread is further configured to store a row number of the first row, the second logical ID, and the second version ID in a cache,
each of the plurality of rows further includes a third column that contains a third-level resource ID that identifies a third-level resource,
a set of unique third-level resource IDs is defined as including only unique third-level resource IDs contained in the third column of the plurality of rows,
for each respective third-level resource ID in the set of unique third-level resource IDs, the one or more threads include a second thread assigned to the respective third-level resource ID, and
the computer-implemented method further comprises:
identifying, by the one or more processors, a second row set for the respective third-level resource ID that comprises ones of the plurality of rows that contain the respective third-level resource ID;
for at least a second row of the second row set:
determining, by the one or more processors, whether a third data element contained in any subordinate column of the second row is different from a fourth data element contained in a corresponding subordinate column of a predecessor row for the second row, wherein the predecessor row for the second row precedes the second row in the second row set;
in response to determining that the third data element is different from the fourth data element, enqueuing the second row in a second queue for the second thread, and
wherein the second thread is configured to, for each third row enqueued in the second queue dequeue the third row from the second queue;
use a row number of the third row to search the cache to obtain a third logical ID of a second second-level resource and a third version ID of the second second-level resource;
send a request causing the server to create, in the hierarchical data store, a third-level resource that specifies the third-level resource ID contained in the third column of the third row;
obtain, from the server, a fourth logical ID and a fourth version ID of the third-level resource; and
send a request causing the server to create, in the hierarchical data store, relationship data for the third-level resource that specify that the third-level resource is a parent of the second second-level resource by specifying the fourth logical ID and the fourth version ID and the third logical ID and the third version ID.

15. The computer-implemented method of claim 14, further comprising, for a fourth row of the second row set, in response to determining that a fifth data element in the second column of the fourth row is not different from a sixth data element in the second column of the fourth row:
obtaining, by the one or more processors, a fifth logical ID of a predecessor second-level resource and a fifth version ID of the predecessor second-level resource, the predecessor second-level resource being a second-level resource created for the predecessor row for the fourth row of the second row set; and storing, by the one or more processors, a row number of the fourth row of the second row set, the fifth logical ID, and the fifth version ID in the cache.

16. The computer-implemented method of claim 10, wherein two or more of the threads that are assigned to the unique first-level resource IDs operate in parallel.

17. The computer-implemented method of claim 10, wherein the server is a Fast Healthcare Interoperability Resources (FHIR) server.

18. The computer-implemented method of claim 10, wherein:
- the plurality of first-level resource IDs include a patient identifier, and the plurality of data elements provides information regarding one or more of patient first name, patient last name, patient address, or patient birth date, or
- the plurality of first-level resource IDs includes a provider ID, and the plurality of data elements provides information regarding one or more of a provider name, or provider address.

19. One or more non-transitory computer readable storage media comprising instructions stored thereon that, when executed by one or more processors, cause the one or more processors to:

obtain a data file comprising a plurality of rows each including a first column and a second column, wherein:
for each row of the plurality of rows, the first column of the row contains a first-level resource identifier (ID), of a plurality of first-level resource IDs, that identifies a respective first-level resource, of a plurality of first-level resources, and the second column contains a data element, of a plurality of data elements, that provides information regarding the respective first-level resource;

initiate one or more threads assigned to one or more unique first-level resource IDs of the plurality of first-level resource IDs; and for each respective unique first-level resource ID of the one or more unique first-level resource IDs:
identify a first row set that comprises one or more of the plurality of rows that contain the respective unique first-level resource ID; and for at least a first row of the first row set:
determine whether a first data element in the second column of the first row is different from a second data element in the second column of a predecessor row from the first row set that precedes the first row;

in response to determining that the first data element is different from the second data element, enqueue the first row in a first queue for a first thread, from the one or more threads, assigned to the respective unique first-level resource ID;

dequeue the first row from the first queue for the first thread; and cause a server to create a second-level resource that stores a version of the first data element.

\* \* \* \* \*